J. P. BROPHY.
SECTIONAL AIR BAG.
APPLICATION FILED JULY 25, 1914.
1,151,859.
Patented Aug. 31, 1915.
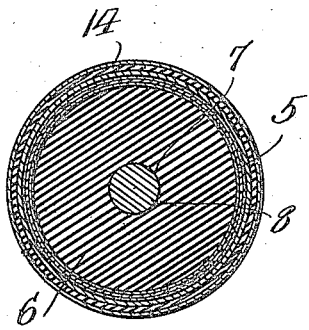
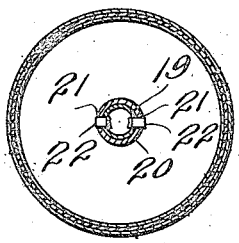
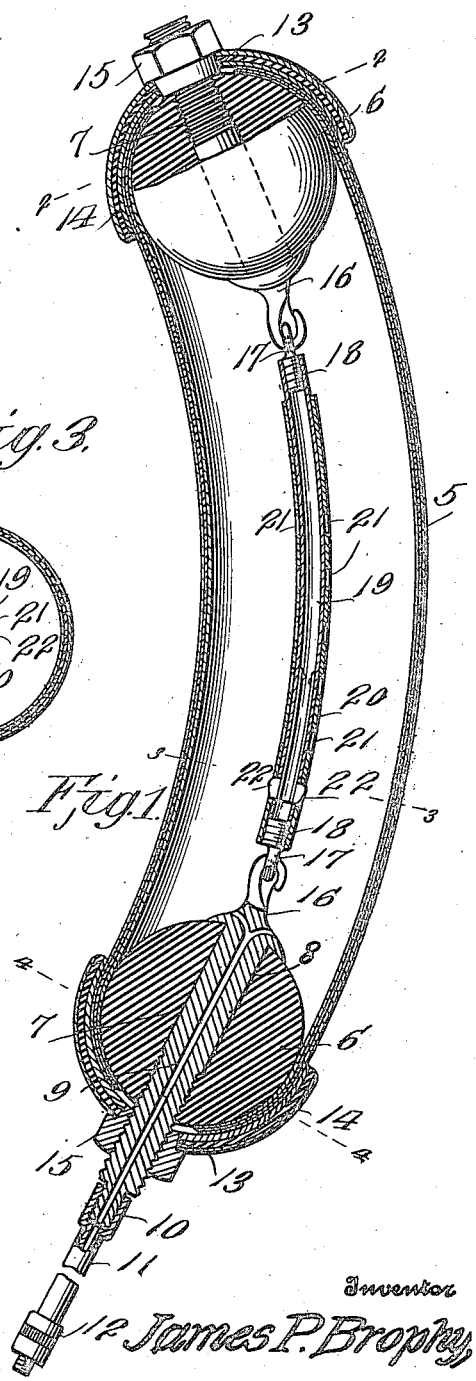
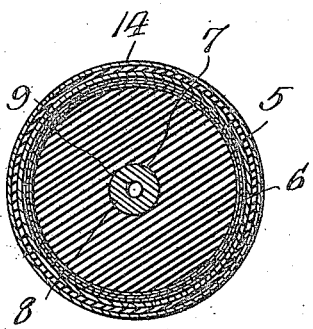
Inventor
James P. Brophy,
By Victor J. Evans
Attorney
Witnesses

UNITED STATES PATENT OFFICE.

JAMES P. BROPHY, OF BIRMINGHAM, ALABAMA.

SECTIONAL AIR-BAG.

1,151,859.     Specification of Letters Patent.     Patented Aug. 31, 1915.

Application filed July 25, 1914. Serial No. 853,250.

*To all whom it may concern:*

Be it known that I, JAMES P. BROPHY, a citizen of the United States, residing at Birmingham, in the county of Jefferson and State of Alabama, have invented new and useful Improvements in Sectional Air-Bags, of which the following is a specification.

The invention relates to an air bag, and more particularly to the class of adjustable sectional air bags for use by vulcanizers.

The primary object of the invention is the provision of a bag of this character wherein the same can be put into a tire in a quick and convenient manner for patching a puncture therein to enable a vulcanizer to cure the same or a blow-out in the said tire.

Another object of the invention is the provision of a bag of this character wherein the body thereof will shape itself to the tire, thus enabling the quick and easy repair thereof, the body of the bag being removable so that in event of breaking of the same a new body can be substituted, thereby increasing the life of the said device.

A still further object of the invention is the provision of a bag of this character wherein the same can be readily adjusted to fit within the tire, and also to enable it to be increased in length or shortened as the occasion may require.

A still further object of the invention is the provision of a bag of this character which can be made in any desirable length for the handy use of the vulcanizer, the construction of the bag being of novel form to permit the convenient assemblage of its parts and to insure durability.

A still further object of the invention is the provision of a bag of this character which is extremely simple in construction, readily and easily adjusted, repaired, lengthened or shortened, also one which is reliable and efficient in operation and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing: Figure 1 is a longitudinal sectional view through an air bag constructed in accordance with the invention. Fig. 2 is a sectional view on the line 2—2 of Fig. 1. Fig. 3 is a sectional view on the line 3—3 of Fig. 1. Fig. 4 is a sectional view on the line 4—4 of Fig. 1.

Similar reference characters indicate corresponding parts throughout the several views in the drawing.

Referring to the drawing in detail, the sectional air bag comprises a tubular body 5 of the required length, preferably made from a plurality of plies of fabric and rubber, in opposite ends of which are removably held spherical-shaped resilient members 6, each being preferably formed from solid rubber having a central bore 7 therein, and through the bores in these members are passed the threaded shanks of headed bolt members 8, one of which is formed with a central inlet air passage 9 having mounted in the outer end thereof a hose nipple 10 to which is connected an air inlet tube 11 of any desirable length, the same carrying a valved attaching nipple 12 for connection with an air pump. The bolt members 8 are also passed through central apertures 13 formed in semi-spherical shaped clamping caps 14 which engage the ends of the body 5 to clamp the same between the spherical member 6 and the said caps 14, the bolts being fitted with jam nuts 15 which are adjustable on the threaded shanks of the bolt members, the latter having their heads working against the spherical members 6 at the inner sides thereof.

Formed on the heads of the bolt members 8 are snap hooks 16, with which detachably engage the eyes 17 of eye bolts 18, the latter being threaded in the outer ends of the two sections 19 and 20 respectively of an adjustable center rod, the sections being hollow, and one telescoping within the other. Provided in the section 20 at diametrically opposite points and at intervals therein are openings or slots 21, while riveted to the inner surface of the section 19 are diametrically opposed resilient catches 22, which are adapted to adjustably engage the openings or slots 21 for the locking of the sections 19 and 20 together in adjusted relation to each other. The sections 19 and 20 of the center rod are correspondingly curved with respect to each other so as to give the proper conformation to the bag for the proper fitting within a tire.

In the use of the device the body 5 thereof is inflated by admitting air through the tube 11 to the interior thereof, the bag being normally collapsed for the convenient insertion of the same within the tire when the bag is to be used for the curing of punctures or blow-outs therein.

It will be apparent that the body 5 can be detached by loosening the nuts 15 and removing the ends of the body from between the spherical member 6 and the clamping caps 14 so that a new body can be substituted or any desired length of body can be used as the occasion may require. The air bag is placed within the tire to underlie the puncture or blow out therein so that the vulcanizer can cure the puncture or blow-out.

From the foregoing it is thought that the construction and manner of use of the device will be clearly understood, and therefore a more extended explanation has been omitted.

What is claimed is:—

1. An air bag comprising an expansible tubular body, resilient members inserted in the ends of said body, outer members coöperative with the resilient members for clamping the ends, means passed through the said members for bringing the same in clamping relation to each other, one of said means being formed with an air inlet, and extensible members connected with the first-named means.

2. An air bag comprising an expansible tubular body, resilient members inserted in the ends of said body, outer members coöperative with the resilient members for clamping the ends, means passed through the said members for bringing the same in clamping relation to each other, one of said means being formed with an air inlet, extensible members connected with the first-named means, and means for locking the extensible means in adjusted position.

3. An air bag comprising an expansible tubular body, resilient members inserted in the ends of said body, outer members coöperative with the resilient members for clamping the ends, means passed through the said members for bringing the same in clamping relation to each other, one of said means being formed with an air inlet, extensible members connected with the first-named means, means for locking the extensible means in adjusted position, and means for detachably connecting the first and second-named means.

In testimony whereof I affix my signature in presence of two witnesses.

JAMES P. BROPHY.

Witnesses:
J. S. McLeroy,
P. J. Thornton.